United States Patent [19]
Mott

[11] Patent Number: 5,182,968
[45] Date of Patent: Feb. 2, 1993

[54] FORCE RATIO CONTROL OF CONTINUOUSLY VARIABLE TRANSMISSIONS

[75] Inventor: Philip J. Mott, Dryden, N.Y.

[73] Assignee: Borg-Warner Automotive Transmission & Engine Components Corporation, Sterling Heights

[21] Appl. No.: 777,000

[22] Filed: Oct. 16, 1991

[51] Int. Cl.⁵ ............................................. F16H 55/56
[52] U.S. Cl. ........................................ 74/856; 74/861; 474/17; 474/18; 474/70
[58] Field of Search ................. 74/856, 861; 474/70, 474/17, 18, 109

[56] References Cited

U.S. PATENT DOCUMENTS

| | | | |
|---|---|---|---|
| 4,321,991 | 3/1982 | Teijido et al. | 474/19 X |
| 4,466,521 | 8/1984 | Hattori et al. | 192/0.032 |
| 4,571,216 | 2/1986 | Stieg et al. | 474/17 X |
| 4,631,043 | 12/1986 | Tokoro et al. | 474/18 |
| 4,691,138 | 6/1987 | Nobumoto et al. | 74/862 |
| 4,731,044 | 3/1988 | Mott | 474/8 |
| 4,735,112 | 4/1988 | Osanai et al. | 74/866 |
| 4,790,214 | 12/1988 | Hattori et al. | 74/866 |
| 4,829,433 | 5/1989 | Nakano et al. | 364/424.1 |
| 4,846,019 | 7/1989 | Kumura | 74/864 |
| 4,881,925 | 11/1989 | Hattori | 474/18 |
| 5,045,028 | 9/1991 | Rattunde et al. | 474/17 |

FOREIGN PATENT DOCUMENTS

| | | | |
|---|---|---|---|
| 0083501 | 7/1983 | European Pat. Off. | 474/17 |
| 1-307559 | 12/1989 | Japan | 474/70 |
| 1-312265 | 12/1989 | Japan | 474/70 |

*Primary Examiner*—Leslie A. Braun
*Assistant Examiner*—Ryan W. Massey
*Attorney, Agent, or Firm*—Willian Brinks Olds

[57] ABSTRACT

A control arrangement for a continuously variable transmission utilizes a relationship between force ratio, speed ratio and the factor of safety to determine the force necessary on the secondary sheave to prevent belt slippage. The control system improves the efficiency of the transmission by reducing the excess clamping force between the CVT chain-belt and the secondary pulley sheave.

10 Claims, 2 Drawing Sheets

FORCE RATIO CONTROL OF CONTINUOUSLY VARIABLE TRANSMISSIONS

BACKGROUND OF THE INVENTION

Reference is made to U.S. Pat. No. 4,731,044, to Philip J. Mott, assigned to Borg-Warner Automotive, Inc., which is incorporated herein by reference and upon which the present invention is an improvement.

1. Field of the Invention

The present invention relates to continuously variable transmissions and control systems for continuously variable transmissions. More particularly, the present invention relates to a control strategy for continuously variable transmissions which utilizes the relationship between force ratio, speed ratio and the factor of safety to determine the output force necessary for the secondary sheave to prevent belt slippage.

2. Description of the Prior Art

Variable pulley transmissions, or continuously variable transmissions (CVTs), known in the prior art primarily for automotive applications, typically comprise a pair of pulleys with an adjustable diameter, an endless belt connecting the pulleys, and a control unit. In conventional continuously variable transmissions, a primary variable pulley or primary sheave system is provided on a primary or input shaft and a secondary variable pulley or secondary sheave system is provided on the secondary or output shaft. Each pulley has at least one sheave that is axially fixed and another sheave that is axially moveable relative to the first sheave. The inner faces of the sheaves are bevelled so that as the axially displaceable sheave moves relative to the fixed sheave, the distance between the sheaves and, thus, the effective pulley diameter may be adjusted. Adjustment of the primary and secondary pulleys thus varies the ratio between the input and output shafts. The primary pulley is conventionally driven by the engine and the output of the secondary pulley drives the drive train of the vehicle. U.S. Pat. No. 4,433,594, titled "Variable Pulley Transmission," provides further information in relation to CVT's and is incorporated herein by reference in terms of background to the present invention.

In conventional continuously variable transmission's the primary sheave is utilized to set the speed ratio, or ratio between the speed of rotation of the input and output shafts. Depending on the desired output speed ratio, the variable pulley on the input shaft is moved axially to adjust the position of the belt within the pulley. The volume of fluid inputted to the servo mechanism of the primary sheave determines the location of the adjustable sheave of the variable pulley along the shaft. Such movement sets the ratio between the input and output shafts.

Once the speed ratio is set by adjustment of the primary sheave, the secondary sheave is utilized to clamp the belt and prevent the belt from slipping. The control unit sends electrical signals to the secondary servo mechanism to provide pressure based on a number of inputs to the control unit. Those inputs include engine output speed, transmission output speed, throttle position and gearshift position. Utilizing this information, the microprocessor in the control unit sets desired values for engine speed, CVT system pressure and clutch coolant. The control system uses these signals to regulate the CVT ratio and the CVT line pressure and maintain the requisite belt tension.

The volume of fluid inputted to the servo mechanism of the secondary sheave, which determines the force of the sheave on the belt to maintain belt tension, is typically determined by a several step procedure. First, the position of the throttle of the vehicle is sensed and a calculation of the engine output torque is made using the torque map in the control system microprocessor. Based on the determined torque and an assumed coefficient of friction for the belt, a determination of the necessary force on the belt to prevent slipping is made by the microprocessor. An appropriate volume of fluid is then sent to the servo mechanism of the secondary sheave to press the sheave against the belt.

The "factor of safety" is a calculation of the amount of actual force on the belt generated by the secondary sheave divided by the amount of force on the belt by the secondary sheave necessary to keep the belt from slipping. The conventional continuously variable transmission control system described above results in an excessive factor of safety on account of the imprecise nature of the system. The system is necessarily imprecise as a result of the reliance on an estimation of the amount of engine torque from the torque map.

An excessive factor of safety results in excess force on the secondary sheave and therefore causes inefficiencies in the system. For example, the excessive force on the secondary to clamp the belt can cause losses in the efficiency of the system by excess friction and can also result in belt wear and decreased automobile fuel economy.

The control strategy of the present invention relies on a relationship between the force ratio, the speed ratio and the factor of safety to determine the necessary force on the secondary sheave. Such a system improves the efficiencies associated with the belt and pulley system of the continuously variable transmission.

OBJECTS OF THE INVENTION

Accordingly, it is an object of the present invention to provide a control arrangement for a continuously variable transmission with increased efficiency achieved by minimizing the excess force on the secondary sheave.

It is a specific object of this invention to achieve increased efficiency in the transmission by sensing the forces and speeds on the primary and secondary sheaves and using the relationship between force ratio, speed ratio, and factor of safety to determine the necessary force between the belt and the secondary sheave.

Other objects, advantages and features of the present invention will become apparent upon reading the following detailed description and appended claims, and upon reference to the accompanying drawings.

SUMMARY OF THE INVENTION

The control system of the present invention utilizes a relationship between the force ratio, speed ratio and factor of safety to determine the necessary force on the secondary sheave of a continuously variable transmission. Rather than control the volume of fluid to the servo mechanism on the basis of a determination of torque, the present invention relies on a control of force based on a determination of the speed ratio and consideration of the factor of safety. Effort is made to control the belt over a constant factor of safety. The result is an improvement in the efficiency of the system.

The control strategy of the present invention is based on the principle that the force ratio, that is, the force applied to the input sheave (or primary sheave) divided by the force applied to the output sheave (or secondary sheave) is a function of the speed ratio (or input speed divided by the output speed) and the factor of safety. This relationship is independent of the torque level, coefficient of friction of the belt, belt weight or belt width. By determining the input force and speed ratio, the relationship can be used to determine the output force necessary to control the belt at a substantially constant factor of safety. This relationship is used to determine the amount of force necessary at the secondary sheave to prevent belt slippage, without utilization of excess force.

The present invention therefore provides a control arrangement for a continuously variable transmission. The transmission includes a primary pulley mounted on a first shaft, a secondary pulley mounted on a second shaft, and a flexible, endless belt intercoupling the primary and secondary pulleys. Each of the pulleys has an axially movable sheave to effect ratio change of the transmission and to maintain the belt in tension.

The control arrangement includes a controller and a series of sensors. A first sensor is positioned to provide a first control signal which varies as a function of the speed of the primary pulley. A second sensor is positioned to provide a second control signal which varies as a function of the speed of the secondary pulley. A third sensor is positioned to provide a third control signal which varies as a function of force on the primary pulley. A fourth sensor is positioned to provide a fourth control signal which varies as a function of force on the secondary pulley.

Means are provided for passing the first, second, third and fourth control signals to the controller. The controller is programmed to determine the minimum amount of force necessary between the belt and secondary sheave to prevent belt slippage based on the relationship between force ratio, speed ratio and factor of safety. The controller determines the force on the basis of a look-up table in the microprocessor that stores the necessary information. The look-up table stores a map of curves representing the relationship between force ratio and speed ratio for various factors of safety. The control is maintained over a substantially constant factor of safety. The map stored in the look-up table is determined on the basis of empirical study. The controller determines which factor of safety to utilize on the basis of criteria previously inputted by the programmer. The controller is programmed to provide signals to adjust the servo mechanism of the secondary sheave to provide the desired force.

The method for controlling the pressure on the secondary sheave comprises a series of method steps. Those steps include sensing the speed of the primary sheave; sensing the speed of the secondary sheave; sensing the force applied between the belt and the primary sheave; sensing the force applied between the belt and the secondary sheave; determining the speed ratio from the sensed speeds an the force ratio from the sensed forces; determining a desired force ratio from a look-up table in the controller, with the desired force ratio being determined on the basis of a desired factor of safety and the determined speed ratio. If the force ratio is too low (indicating an excessive factor of safety), then the secondary force is decreased slightly. Force ratios which are higher than those desired indicate that the factor of safety is insufficient and thus require increased secondary force. This feedback cycle is repeated many times per second allowing for continual reassessment of the optimal secondary force.

BRIEF DESCRIPTION OF THE DRAWINGS

For a more complete understanding of this invention, reference should be made to the embodiments illustrated in greater detail in the accompanying drawings, and described below by way of examples of the invention.

In the drawings.

DETAILED DESCRIPTION OF THE DRAWINGS

Figure 1:
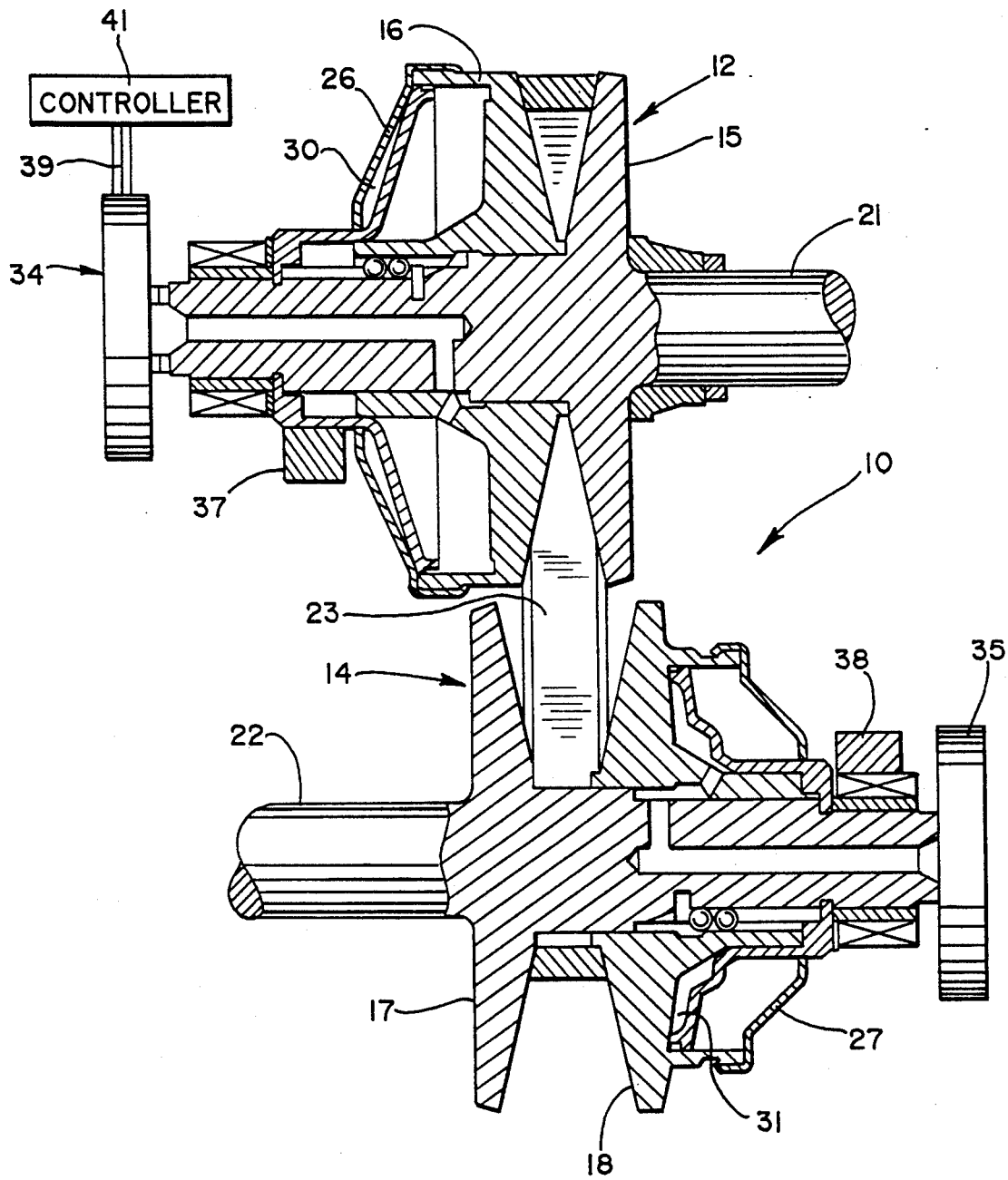
FIG. 1 is a schematic drawing of a cross-section through a pair of pulleys illustrating a first embodiment of the force and speed sensor arrangement.

Turning now to the drawings, FIG. 1 illustrates a typical continuously variable transmission with a movable sheave type pulley arrangement, shown generally at 10. The CVT includes a primary, or input, pulley 12 and secondary, or output, pulley 14. The primary pulley includes a fixed sheave 15 and movable sheave 16. The secondary pulley also includes a fixed sheave 17 and a movable sheave 18. The fixed and movable sheaves allow the adjustment or variation of the effective diameters of the pulleys to allow a change in ratio across the pulleys.

The primary pulley is mounted on a first, or input, shaft 21 and the secondary pulley is mounted on a second, or output, shaft 22. A flexible, endless belt 23 interconnects the primary and secondary pulleys and provides a means for transmission of power between the variable pulleys. Examples of such belts are found in U.S. Pat. Nos. 4,943,266 and 4,911,682.

Each of the movable sheaves, 16, 18, includes respective wall portions 26, 27, which cooperate to define respective fluid chambers 30, 31. The fluid chambers act to receive fluid to provide the servo mechanism for movement of the movable sheaves 16, 18, in response to filling and exhaustion of fluid from the chambers.

Speed sensors 34, 35 are operatively located adjacent to the respective shafts 21, 22 to sense the speed of the shafts for the controller. Force sensors 37, 38 are located adjacent to the respective sheaves to sense the force on each of the primary and secondary sheaves for the controller. The sensors may be positioned to sense either directly or indirectly the respective signals. The details of the sensors are set forth in Mott U.S. Pat. No. 4,731,044, which is incorporated herein by reference.

The force and speed sensors send electrical signals indicative of the force and speed on the primary pulley and secondary pulley through lines or conductors 39 to controller 41. Controller 41 typically includes a microprocessor which determines the appropriate amount of force between the belt and the secondary sheave based on the relationship between force ratio, speed ratio, and factor of safety. The controller sends the appropriate electrical signals on lines 39 to set the servo mechanism of the secondary sheave to a position. FIG. 1 illustrates a typical variable pulley transmission and is meant to be an example only, as the sensors may be positioned in various locations to sense the required information.

Figure 2:
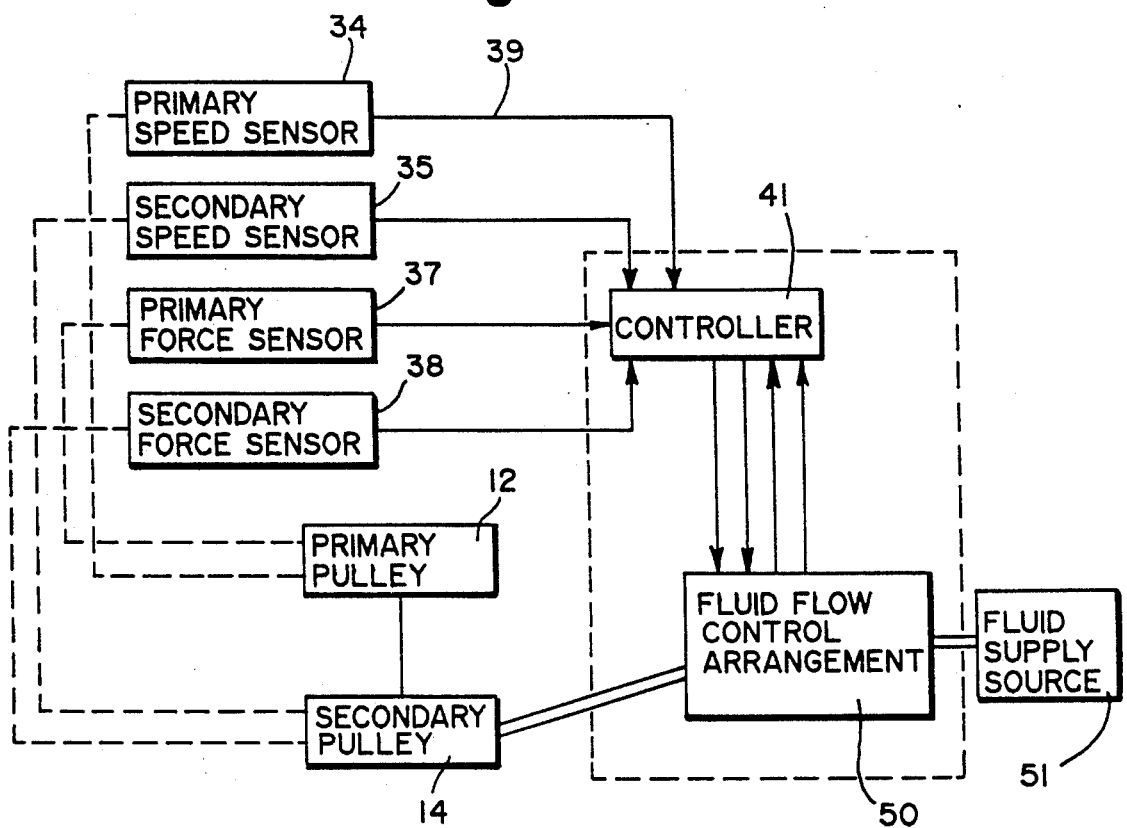
FIG. 2 is a schematic block diagram illustrating an example of a control arrangement utilizing the force and speed sensors.

FIG. 2 is a block diagram illustration of a continuously variable transmission which employs the control arrangement of the present invention. In this illustration, controller 41 is coupled to a fluid flow control arrangement 50 for adjusting the force on the secondary sheave. Primary and secondary speed sensors provide signals on lines 39 to the controller 41 which indicate the speed of the respective pulleys. Primary and secondary force sensors provide signals which indicate the force on the respective variable pulleys. The controller determines the required ratio and outputs a signal to set the primary pulley to achieve the desired ratio. The controller then determines the desired force on the secondary sheave and provides an appropriate control signal to the fluid flow control arrangement 50, which interacts with the fluid supply source 51.

The controller stores the empirical relationship between force ratio and speed ratio for various factors of safety. The controller uses the relationship to determine the desired force ratio from the speed ratio and predetermined factor of safety. The desired factor of safety is usually 1.3 for optimal efficiency and wear. Once the force ratio is determined, the appropriate output force between the belt and the secondary pulley is determined and a signal is outputted to the secondary sheave.

Figure 3:
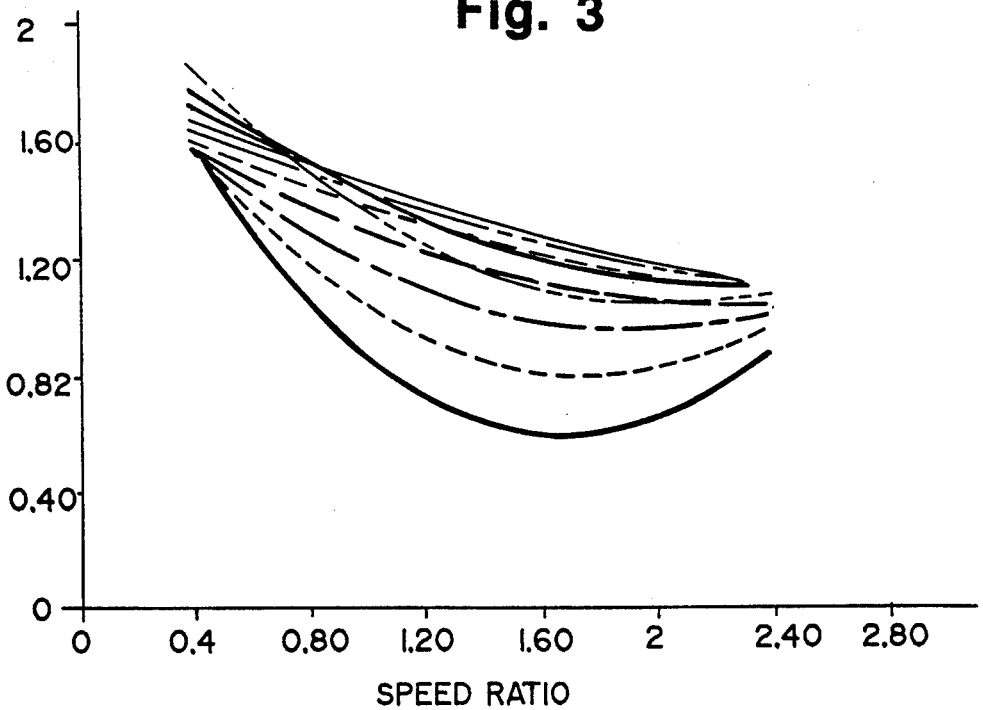
FIG. 3 is a graphical illustration showing typical force ratio vs. speed ratio curves, for constant factors of safety.

FIG. 3 is included to indicate the empirical relationship between force ratio and speed ratio that was determined for several factors of safety. This data is only representative of a sample plot with one embodiment of the CVT of the present invention and is not intended to demonstrate any particular results other than the generally expected relationship upon which the control system of the present invention is based.

The method for controlling the pressure on the secondary sheave thus includes a series of method steps. Those steps include utilizing the sensors to sense (1) the speed of the primary sheave; (2) the speed of the secondary sheave; (3) the force applied to the primary sheave; and, (4) the force applied to the secondary sheave. After signals having an indication of the forces and speeds are sent to the controller, the controller determines the speed ratio, by dividing the input speed by the output speed, and the force ratio, by dividing the primary force by the secondary force.

Next, the controller determines a desired force ratio from a look-up table stored in the controller. The desired force ratio is determined on the basis of a desired factor of safety and the determined speed ratio. The factor of safety has been previously set or determined by inputs to the controller. The look-up table contains a map of the force ratio vs. speed ratio relationship for various factors of safety, which have been experimentally derived.

The controller then compares the measured force ratio with the desired force ratio. If the measured force ratio is too low, indicating an excessive secondary force, the secondary force is decreased. If the measured force ratio is higher than the desired force ratio, the secondary force is increased. This feedback cycle is repeated in an iterative process to allow continual reassessment and control of the secondary force to achieve an optimal secondary force.

It is to be understood that the invention is not limited to the above-described embodiments. Those skilled in the art to which the invention pertains may make modifications and other embodiments employing the foregoing teachings.

What is claimed is:

1. In a continuously variable transmission having a primary pulley, a secondary pulley, and an endless belt interconnecting the primary and secondary pulleys, a method for controlling the pressure on the secondary pulley, comprising the steps of:
    sensing the speed of the primary pulley;
    sensing the speed of the secondary pulley;
    sensing the force applied to the belt by the primary pulley;
    sensing the force applied to the belt by the secondary pulley;
    determining the measured speed ratio from said sensed speeds;
    determining a measured force ratio from said sensed forces;
    determining a desired force ratio from a look-up table in the controller, said desired force ratio being determined on the basis of a predetermined factor of safety and the determined speed ratio;
    comparing said measured force ratio with said desired force ratio;
    modifying the secondary force applied to the belt by the secondary pulley.

2. The method of claim 1 wherein said modifying step is achieved by said controller sending the appropriate electrical signals to set the servo mechanism of the secondary pulley.

3. The method of claim 1 wherein said secondary force is decreased for conditions of said measured force ratio being less than said desired force ratio.

4. The method of claim 1 wherein said secondary force is increased for conditions of said measured force ratio being greater than said desired force ratio.

5. The method of claim 1 wherein said comparing step and said modifying step are repeated in an iterative process.

6. A control arrangement for a continuously variable transmission, said transmission including a primary pulley mounted on a first shaft, a secondary pulley mounted on a second shaft, and an endless belt intercoupling said primary and secondary pulleys, each of said pulleys having an axially movable sheave to effect ratio change of the transmission and to maintain the belt in tension, said control arrangement comprising:
    a controller;
    a first sensor positioned to provide a first control signal which varies as a function of the speed of said primary pulley;
    a second sensor positioned to provide a second control signal which varies as a function of speed of said secondary pulley;
    a third sensor positioned to provide a third control signal which varies as a function of force applied to the belt by said primary pulley;
    a fourth sensor positioned to provide a fourth control signal which varies as a function of force applied to the belt by said secondary pulley;
    means for passing said first, second, third and fourth signals to said controller, said controller programmed to determine the minimum amount of force necessary between the belt and secondary sheave to prevent belt slippage based on the relationship between the force ratio, speed ratio and factor of safety, said controller programmed to provide signals to adjust the servo mechanism of said secondary sheave to provide the desired force.

7. The control arrangement of claim 6 wherein said factor of safety is set within the controller.

8. The control arrangement of claim 6 wherein a desired factor of safety and a measured speed ratio determine the force ratio from a look-up table in said controller.

9. The control arrangement of claim 6 wherein said controller compares a desired force ratio to a measured force ratio, said secondary force applied to the belt by said secondary sheave being modified in response to said controller comparison.

10. The control arrangement of claim 6 wherein a desired force ratio and a measured force ratio are repeatedly compared by said controller, said secondary force being modified to attain an optimal level.

* * * * *